United States Patent
Brisebois et al.

(10) Patent No.: US 10,599,646 B2
(45) Date of Patent: Mar. 24, 2020

(54) SYMBIOTIC DATA INSIGHTS FROM HARMONIZED QUERIES

(71) Applicant: QUEST SOFTWARE INC., Aliso Viejo, CA (US)

(72) Inventors: Michel Albert Brisebois, Renfrew (CA); Curtis T Johnstone, Ottawa (CA); Catherine Helbig Dibble, Santa Clara, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 529 days.

(21) Appl. No.: 15/138,701

(22) Filed: Apr. 26, 2016

(65) Prior Publication Data

US 2017/0308573 A1 Oct. 26, 2017

(51) Int. Cl.
*G06F 16/2453* (2019.01)

(52) U.S. Cl.
CPC .............. *G06F 16/24535* (2019.01)

(58) Field of Classification Search
CPC ......... G06F 17/30864; G06F 17/30545; G06F 17/30445; G06F 17/30424; G06F 17/30451; G06F 16/24535
USPC .......... 707/999.003, 769, E17.108, 706, 722
See application file for complete search history.

(56) References Cited

U.S. PATENT DOCUMENTS

| | | | | |
|---|---|---|---|---|
| 2002/0198869 A1* | 12/2002 | Barnett | ............. | G06F 17/30864 |
| 2004/0158551 A1* | 8/2004 | Santosuosso | ..... | G06F 16/24542 |
| 2007/0192300 A1* | 8/2007 | Reuther | ............ | G06F 17/30427 |
| 2014/0074850 A1* | 3/2014 | Noel | ....................... | G06F 9/542 |
| | | | | 707/741 |

OTHER PUBLICATIONS

U.S. Appl. No. 13/906,246, Brisebois et al.
U.S. Appl. No. 13/906,241, Brisebois et al.
U.S. Appl. No. 13/906,255, Brisebois et al.

\* cited by examiner

*Primary Examiner* — Robert W Beausoliel, Jr.
*Assistant Examiner* — Pedro J Santos
(74) *Attorney, Agent, or Firm* — Maschoff Brennan

(57) ABSTRACT

Aspects of the present disclosure relate to systems and methods for multi-data source query implementation and aggregation. In embodiments, the query aggregation system comprises a data abstraction engine, a query controller or scheduler and an aggregator. In embodiments, the data abstraction engine normalizes data schemas from multiple data sources based on the parameter requirements. In embodiments, the query controller schedules and runs normalized queries against each data sources independently and securely. In embodiments, the aggregator collects and merges the aggregates of the results into a single analysis. In embodiments, the query aggregation system communicates to various data sources including enterprise data silo(s) and personal data silo(s) to send queries and receive query results. In embodiments, the query sent to each data source may be specialized or tailored for the specific requirement of the data source.

20 Claims, 8 Drawing Sheets

SYMBIOTIC DATA INSIGHTS FROM HARMONIZED QUERIES

BACKGROUND

A. Technical Field

The present disclosure relates generally to data aggregation and analysis. More particularly, the present disclosure relates to systems and methods for multi-data source query implementation and aggregation.

B. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Technologies such as big data, behavioral classifications, and data abstraction/normalization have allowed organizations to gain insights into their business activities and communications. Products like Dell's new Unified Communications Command Suite (UCCS) collect data from disparate enterprise systems such as Exchange, Lync, Active Directory, Cisco IP telephony, Internet Information Server (IIS), etc. Insights into organizational behavior are created from the correlation and analysis of that data.

The data partitions between company, partners and individuals are scrutinized more and more due to expanding privacy laws. Moreover, the implementation of prescriptive data usage contracts can sometimes limit the scope of insights, or reduce its utility due to anonymization of personally identifiable information (PII).

In certain situations, a user or group wants to add data from a private source and run an aggregated insight, for example, for a useful report to compare response times from a user's corporate email to the user's personal email, such as the user's personal Gmail account. Neither the employee nor the employer may want to start collecting personal email accounts into their Unified Communications (UC) database. In another scenario, a contractor/supplier would like to have extranet access—but wants to have an integrated look with their own corporate email included. There might be no way that the supplier's corporate emails would be collected by their client. In yet another scenario, a firm or corporation could like to import product usage data from other partners' databases. Such activity could be blocked by privacy and competition laws, as well as the terms of the vendor/customer contract.

Accordingly, what is needed are systems and methods to generate single insights using multiple private data sources, while maintaining security, contractual and regulatory compliance.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
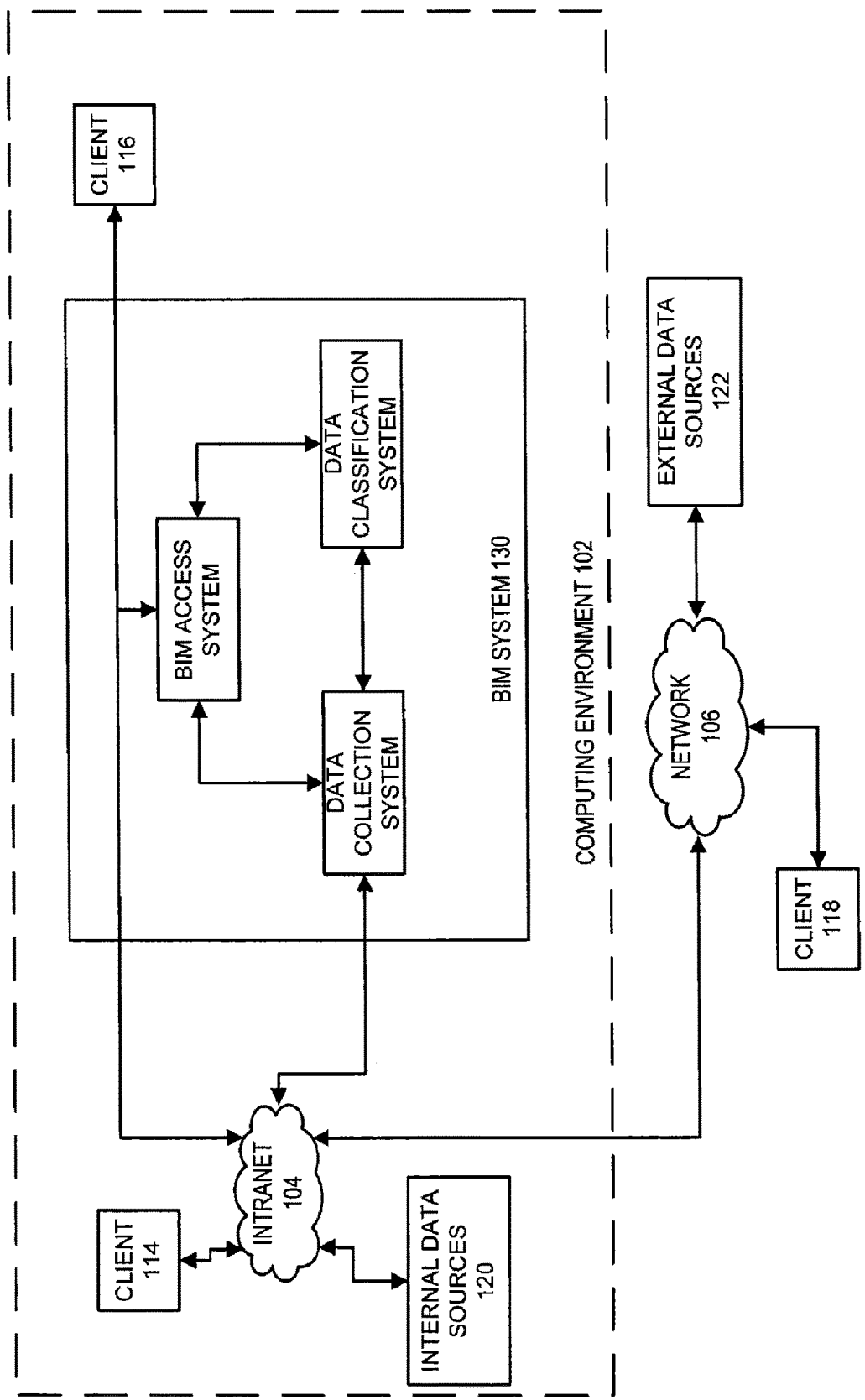
FIG. 1 depicts a networked computing environment including a Business Insight on Messaging (BIM) access system allowing a user to create, share, and access query packages.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system/device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits that can be transported across a network. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." It shall be noted that the use of the terms "set" and "group" in this patent document shall include any number of elements.

Each reference mentioned in this patent document is incorporate by reference herein in its entirety. Furthermore, one skilled in the art shall recognize that: (1) certain steps may optionally be performed; (2) steps may not be limited to the specific order set forth herein; (3) certain steps may be performed in different orders; and (4) certain steps may be done concurrently.

This disclosure describes exemplary systems and methods for multi-source data query implementation/aggregation and reassembling various query results into a single analysis. The data sources can be internal and/or external business data source, as well as private data source, such as data from a personal email account. For example, the data sources can include sales databases, business or internal email systems, non-business or external email systems, social networking accounts, inventory databases, file directories, enterprise systems, customer relationship management (CRM) systems, organizational directories, collaboration systems (e.g., SharePoint™ servers), private email accounts etc.

Figure 2:
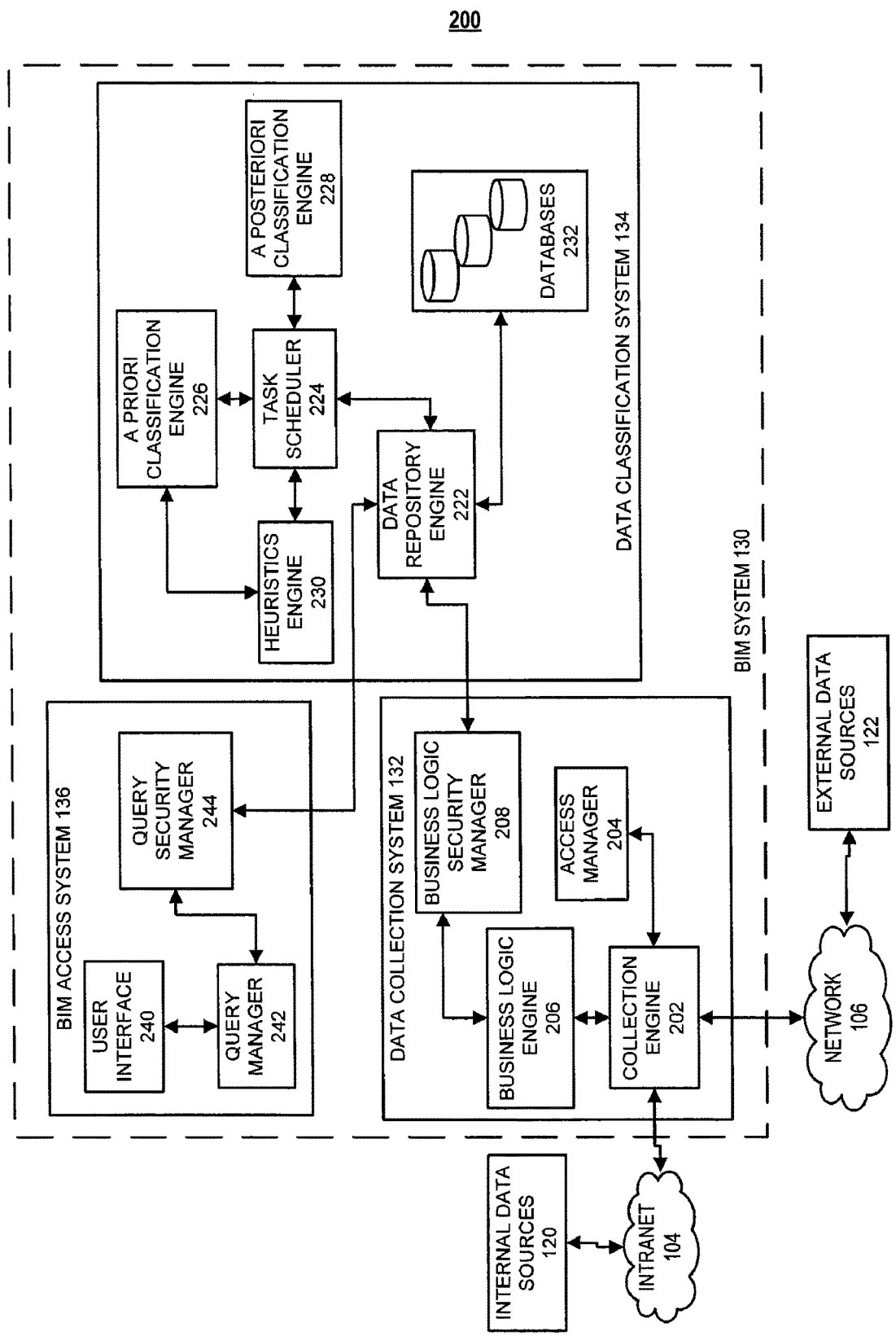
FIG. 2 depicts a Business Insight on Messaging (BIM) system.

FIG. 1 is a networked computing environment including a Business Insight on Messaging (BIM) access system allowing a user to create, share, and access query packages. FIG. 2 depicts a Business Insight on Messaging (BIM) system. Embodiments of BIMs are discussed in: U.S. Prov. Pat. App. No. 61/658,034, filed on Jun. 11, 2012; U.S. patent application Ser. No. 13/906,246, filed on May 30, 2013; U.S. patent application Ser. No. 13/906,241, filed on May 30, 2013; and U.S. patent application Ser. No. 13/906,255, filed on May 30, 2013. Each of the patent documents mentioned herein is incorporated by reference herein in its entirety.

The networked computing environment 100 can include a computing environment 102 that is associated with a business or organization. The computing environment 102 may vary based on the type of organization or business. However, generally, the computing environment 102 may include at least a number of computing systems. For example, the computing environment may include clients, servers, databases, mobile computing devices (e.g., tablets, laptops, smartphones, etc.), virtual computing devices, shared computing devices, networked computing devices, and the like. Further, the computing environment 102 may include one or more networks, such as intranet 104.

The computing environment 102 includes a Business Insights on Messaging (BIM) system 130. Using the BIM system 130, a user can examine the data available to a business regardless of where the data was generated or is stored. Further, in some embodiments, the user can use the BIM system 130 to identify trends and/or metadata associated with the data available to the BIM system 130. In certain embodiments, the BIM system 130 can access the data from internal data sources 120, external data sources 122, or a combination of the two. The data that can be accessed from the internal data sources 120 can include any data that is stored within the computing environment 102 or is accessed by a computing system that is associated with the computing environment 102. For example, the data may include information stored in employee created files, log files, archived files, internal emails, outgoing emails, received emails, received files, data downloaded from an external network or the Internet, etc. The type of data is not limited and may depend on the organization or business associated with the computing environment 102. For example, the data can include sales numbers, contact information, vendor costs, product designs, meeting minutes, the identity of file creators, the identity of file owners, the identity of users who have accessed a file or are authorized to access a file, etc.

The data that can be accessed from the external data sources 122 can include any data that is stored outside of the computing environment 102 and is publicly accessible or otherwise accessible to the BIM system 130. For example, the data can include data from social networking sites, customer sites, Internet sites, or any other data source that is publicly accessible or which the BIM system 130 has been granted access. In some cases, a subset of the data may be unavailable to the BIM system 130. For example, portions of the computing environment 102 may be configured for private use.

The internal data sources 120 can include any type of computing system that is part of or associated with the computing environment 102 and is available to the BIM system 130. These computing systems can include database systems or repositories, servers (e.g., authentication servers, file servers, email servers, collaboration servers), clients, mobile computing systems (including e.g., tablets, laptops, smartphones, etc.), virtual machines, CRM systems, directory services, such as lightweight directory access protocol (LDAP) systems, and the like. Further, in some cases, the internal data sources 120 can include the clients 114 and 116. The external data sources 122 can include any type of computing system that is not associated with the computing environment 102, but is accessible to the BIM system 130. For example, the external data sources 122 can include any computing systems associated with cloud services, social media services, hosted applications, etc.

The BIM system 130 can communicate with the internal data sources 120 via the intranet 104. The intranet 104 can include any type of wired and/or wireless network that enables computing systems associated with the computing environment 102 to communicate with each other. For example, the intranet 104 can include any type of a LAN, a WAN, an Ethernet network, a wireless network, a cellular network, a virtual private network (VPN) and an ad hoc network. In some embodiments, the intranet 104 may include an extranet that is accessible by customers or other users who are external to the business or organization associated with the computing environment 102.

The BIM system 130 can communicate with the external data sources 122 via the network 106. The network 106 can include any type of wired, wireless, or cellular network that enables one or more computing systems associated with the computing environment 102 to communicate with the external data sources 122 and/or any computing system that is not associated with the computing environment 102. In some cases, the network 106 can include the Internet.

A user can access the BIM system 130 using any computing system that can communicate with the BIM system 130. For example, the user can access the BIM system 130 using the client 114, which can communicate with the BIM system 130 via the intranet 104, the client 116, which can communicate via a direct communication connection with the BIM system 130, or the client 118, which can communicate with the BIM system 130 via the network 106. As illustrated in FIG. 1, in some embodiments the client 118 may not be associated with the computing environment 102. In such embodiments, the client 118 and/or a user associated with the client 118 may be granted access to the BIM system 130. The clients 114, 116, and 118 may include any type of computing system including, for example, a laptop, desktop, smartphone, tablet, or the like. In some embodiments, the BIM system 130 may determine whether the user is authorized to access the BIM system 130 as described in further detail below.

The BIM system 130 can include a data collection system 132, a data classification system 134, and a BIM access system 136. The data collection system 132 can collect data or information from one or more data sources for processing by the BIM system 130. In some embodiments, the data collection system 132 can reformat the collected data to facilitate processing by the BIM system 130. Further, in some cases, the data collection system 132 may reformat collected data into a consistent or defined format that enables the comparison or processing of data that is of the same or a similar type, but which may be formatted differently because, for example, the data is obtained from different sources. The data collection system 132 is described in more detail below with reference to FIG. 2.

The data classification system 134 can store and classify the data obtained by the data collection system 132. In addition to predefined classifications, the data classification system 134 can identify and develop new classifications and associations between data using, for example, heuristics and probabilistic algorithms.

The BIM access system 136 can provide users with access to the BIM system 130. In some embodiments, the BIM access system 136 determines whether a user is authorized to access the BIM system 130. The BIM access system 136 enables a user to query one or more databases (not shown) of the data classification system 134 to obtain access to the data collected by the data collection system 132. Further, the BIM access system 136 enables a user to mine the data and/or to extract metadata by, for example, creating queries based on the data and the data classifications. Advantageously, in certain embodiments, because the data classification system 134 can classify data obtained from a number of data sources, more complex queries can be created compared to a system that can only query its own database or a single data source.

Additionally, in certain embodiments, the BIM access system 136 can enable users to create, share, and access query packages. As described in greater detail below, a query package can encapsulate one or more pre-defined queries, one or more visualizations of queried data, and other package attributes. When a user selects a query package, the query package can be executed in a determined manner in similar fashion to other queries. As an additional advantage, in some embodiments, because the data classification system 134 can use heuristics and probabilistic algorithms to develop and modify data classifications over time, user queries are not limited to a set of predefined search variables.

Example Implementation of a BIM System

FIG. 2 illustrates an embodiment of an implementation of the BIM system 130 disclosed in FIG. 1. As previously described above, the BIM system 130 can include a data collection system 132 configured to, among other things, collect data from the internal data sources 120 and/or the external data sources 122. The data collection system 132 can include a collection engine 202, an access manager 204, a business logic engine 206, and a business logic security manager 208.

Generally, the collection engine 202 may access the internal data sources 120 thereby providing the BIM system 130 with access to data that is stored by or generated by the internal data sources 120. This data can include any data that may be created, accessed, or received by a user or in response to the actions of a user who is associated with the computing environment 102. Further, in some embodiments, the collection engine 202 can access the external data sources 122 thereby providing the BIM system 130 with access to data from the external data sources 122. In some embodiments, the data can include metadata. For example, supposing that the collection engine 202 accesses a file server, the data can include metadata associated with the files stored on the file server, such as the file name, file author, file owner, time created, last time edited, etc.

In some cases, a number of internal data sources 120 and/or external data sources 122 may require a user or system to be identified and/or authenticated before access to the data source is granted. Authentication may be required for a number of reasons. For example, the data source may provide individual accounts to users, such as a social networking account, email account, or collaboration system account. As another example, the data source may provide different features based on the authorization level of a user. For example, a billing system may be configured to allow all employees of an organization to view invoices, but to only allow employees of the accounting department to modify invoices.

For data sources that require authentication or identification of a specific user, the access manager 204 can facilitate access to the data sources. The access manager 204 can manage and control credentials for accessing the data sources. For example, the access manager 204 can store and manage user names, passwords, account identifiers, certificates, tokens, and any other information that can be used to access accounts associated with one or more internal data sources 120 and/or external data sources 122. For instance, the access manager 204 may have access to credentials associated with a business's Facebook™ or Twitter™ account. As another example, the access manager may have access to credentials associated with an LDAP directory, a file management system, or employee work email accounts.

In some embodiments, the access manager 204 may have credentials or authentication information associated with a master or super user account enabling access to some or all of the user accounts without requiring credentials or authentication information associated with each of the users. In some cases, the collection engine 202 can use the access manager 204 to facilitate accessing internal data sources 120 and/or external data sources 122.

The business logic engine 206 can include any system that can modify or transform the data collected by the collection engine 202 into a standardized format. In some embodiments, the standardized format may differ based on the data source accessed and/or the type of data accessed. For example, the business logic engine 206 may format data associated with emails, data associated with files stored at the computing environment 102, data associated with web pages, and data associated with research files differently. However, each type of data may be formatted consistently. Thus, for example, data associated with product design files may be transformed or abstracted into a common format regardless of whether the product design files are of the same type. As a second example, suppose that the business logic engine 206 is configured to record time using a 24-hour clock format. In this second example, if one email application records the time an email was sent using a 24-hour clock format, and a second email application uses a 12-hour clock format, the business logic engine 206 may reformat the data from the second email application to use a 24-hour clock format In some embodiments, a user may define the format for processing and storing different types of data. In other embodiments, the business logic engine 206 may identify a standard format to use for each type of data based on, for example, the format that is most common among similar types of data sources, the format that reduces the size of the information, or any other basis that can be used to decide a data format.

The business logic security manager 208 can include any system that can implement security and data access policies for data accessed by the collection engine 202. In some embodiments, the business logic security manager 208 may apply the security and data access policies to data before the data is collected as part of a determination of whether to collect particular data. For example, an organization may designate a private folder or directory for each employee and the data access policies may include a policy to not access any files or data stored in the private directory. Alternatively, or in addition, the business logic security manager 208 may apply the security and data access policies to data after it is collected by the collection engine 202. Further, in some cases, the business logic security manager 208 may apply the security and data access policies to the abstracted and/or reformatted data produced by the business logic engine 206. For example, suppose the organization associated with the computing environment 102 has adopted a policy of not collecting emails designated as personal. In this example, the business logic security manager 208 may examine email to determine whether it is addressed to an email address designated as personal (e.g., email addressed to family members) and if the email is identified as personal, the email may be discarded by the data collection system 132 or not processed any further by the BIM system 130.

In some embodiments, the business logic security manager 208 may apply a set of security and data access policies to any data or metadata provided to the classification system 134 for processing and storage. These security and data access policies can include any policy for regulating the storage and access of data obtained or generated by the data collection system 132. For example, the security and data access policies may identify the users who can access the data provided to the data classification system 134. The determination of which users can access the data may be based on the type of data. The business logic security manager 208 may tag the data with an identity of the users, or class or role of users (e.g., mid-level managers and more senior) who can access the data. As another example, of a security and data access policy, the business logic security manager 208 may determine how long the data can be stored by the data classification system 134 based on, for example, the type of data or the source of the data.

After the data collection system 132 has collected and, in some cases, processed the data obtained from the internal data sources 120 and/or the external data sources 122, the data may be provided to the data classification system 134 for further processing and storage. The data classification system 134 can include a data repository engine 222, a task scheduler 224, an a priori classification engine 226, an a posteriori classification engine 228, a heuristics engine 230 and a set of databases 232.

The data repository engine 222 can include any system for storing and indexing the data received from the data collection system 132. The data repository engine 222 can store the data, including any generated indexes, at the set of databases 232, which can include one or more databases or repositories for storing data. In some cases, the set of databases 232 can store data in separate databases based on any factor including, for example, the type of data, the source of data, or the security level or authorization class associated with the data and the class of users who can access the data.

In some implementations, the set of databases 232 can dynamically expand and, in some cases, the set of databases 232 may be dynamically structured. For example, if the data repository engine 222 receives a new type of data that includes metadata fields not supported by the existing databases of the set of databases 232, the data repository engine 222 can create and initialize a new database that includes the metadata fields as part of the set of databases 232. For instance, suppose the organization associated with the computing environment 102 creates its first social media account for the organization to expand its marketing initiatives. Although the databases 232 may have fields for customer information and vendor information, it may not have a field identifying whether a customer or vendor has indicated they "like" or "follow" the organization on its social media page. The data repository engine 222 can create a new field in the databases 232 to store this information and/or create a new database to capture information extracted from the social media account including information that relates to the organization's customers and vendors.

In certain embodiments, the data repository engine 222 can create abstractions of and/or classify the data received from the data collection system 132 using, for example, the task scheduler 224, the a priori classification engine 226, the a posteriori classification engine 228, and the heuristics engine 230. The task scheduler 224 can include any system that can manage the abstraction and classification of the data received from the data collection system 132. In some embodiments, the task scheduler 224 can be included as part of the data repository engine 222.

Data that is to be classified and/or abstracted can be supplied to the task scheduler 224. The task scheduler 224 can supply the data to the a priori classification engine 226, which can include any system that can classify data based on a set of user-defined, predefined, or predetermined classifications. These classifications may be provided by a user (e.g., an administrator) or may be provided by the developer of the BIM system 130. Although not limited as such, the predetermined classifications generally include objective classifications that can be determined based on attributes associated with the data. For example, the a priori classification engine 226 can classify communications based on whether the communication is an email, an instant message, or a voice mail. As a second example, files may be classified based on the file type, such as whether the file is a drawing file (e.g., an AutoCAD™ file), a presentation file (e.g., a PowerPoint™ file), a spreadsheet (e.g., an Excel™ file), a word processing file (e.g., a Word™ file), etc. Although not limited as such, the a priori classification engine 226 generally classifies data at or substantially near the time of collection by the collection engine 202. The a priori classification engine 226 can classify the data prior to the data being stored in the databases 232. However, in some cases, the data may be stored prior to or simultaneously with the a priori classification engine 226 classifying the data. The data may be classified based on one or more characteristics or pieces of metadata associated with the data. For example, an email may be classified based on the email address, a domain or provider associated with the email (e.g., a Yahoo® email address or a corporate email address), or the recipient of the email.

In addition to, or instead of, using the a priori classification engine 226, the task scheduler 224 can provide the data to the a posteriori classification engine 228 for classification or further classification. The a posteriori classification engine 228 can include any system that can determine trends with respect to the collected data. Although not limited as such, the a posteriori classification engine 228 generally classifies data after the data has been collected and stored at the databases 232. However, in some cases, the a posteriori classification engine 228 can also be used to classify data as it is collected by the collection engine 202. Data may be processed and classified or reclassified multiple times by the a posteriori classification engine 228. In some cases, the classification and reclassification of the data occurs on a continuing basis. In other cases, the classification and reclassification of data occurs during specific time periods of events. For example, data may be reclassified each day at midnight or once a week. As another example, data may be reclassified each time one or more of the a posteriori algorithms is modified or after the collection of new data.

In some cases, the a posteriori classification engine 228 classifies data based on one or more probabilistic algorithms. The probabilistic algorithms may be based on any type of statistical analysis of the collected data. For example, the probabilistic algorithms may be based on Bayesian analysis or probabilities. Further, Bayesian inferences may be used to update the probability estimates calculated by the a posteriori classification engine 228. In some implementations, the a posteriori classification engine 228 may use machine learning techniques to optimize or update the a posteriori algorithms. In some embodiments, some of the a posteriori algorithms may determine the probability that a piece or set of data (e.g., an email) should have a particular classification based on an analysis of the data as a whole. Alternatively, or in addition, some of the a posteriori algorithms may determine the probability that a set of data should have a particular classification based on the combination of probabilistic determinations associated with subsets of the data, parameters, or metadata associated with the data (e.g., classifications associated with the content of the email, the recipient of the email, the sender of the email, etc.).

For example, continuing with the email example, one probabilistic algorithm may be based on the combination of the classification or determination of four characteristics associated with the email, which may be used to determine whether to classify the email as a personal email, or non-work related. The first characteristic can include the probability that an email address associated with a participant (e.g., sender, recipient, BCC recipient, etc.) of the email conversation is used by a single employee. This determination may be based on the email address itself (e.g., topic based versus name based email address), the creator of the email address, or any other factor that can be used to determine whether an email address is shared or associated with a particular individual. The second characteristic can include the probability that keywords within the email are not associated with peer-to-peer or work-related communications. For example, terms of endearment and discussion of children and children's activities are less likely to be included in work related communications. The third characteristic can include the probability that the email address is associated with a participant domain or public service provider (e.g., Yahoo® email or Google® email) as opposed to a corporate or work email account. The fourth characteristic can include determining the probability that the message or email thread can be classified as conversational as opposed to, for example, formal. For example, a series of quick questions in a thread of emails, the use of a number of slang words, or excessive typographical errors may indicate that an email is likely conversational. The a posteriori classification engine 228 can use the determined probabilities for the above four characteristics to determine the probability that the email communication is personal as opposed to, for example, work-related, or spam email.

The combination of probabilities may not total 100%. Further, the combination may itself be a probability and the classification can be based on a threshold determination. For example, the threshold may be set such that an email is classified as personal if there is a 90% probability for three of the four above parameters indicating the email is personal (e.g., email address is used by a single employee, the keywords are not typical of peer-to-peer communication, at least some of the participant domains are from known public service providers, and the message thread is conversational).

As another example of the a posteriori classification engine 228 classifying data, the a posteriori classification engine 228 can use a probabilistic algorithm to determine whether a participant of an email is a customer. The a posteriori classification engine 228 can use the participant's identity (e.g., a customer) to facilitate classifying data that is associated with the participant (e.g., emails, files, etc.). To determine whether the participant should be classified as a customer, the a posteriori classification engine 228 can examiner a number of parameters including a relevant Active Directory Organizational Unit (e.g., sales, support, finance) associated with the participant and/or other participants in communication with the participant, the participant's presence in forum discussions, etc. In some cases, characteristics used to classify data may be weighted differently as part of the probabilistic algorithm. For example, email domain may be a poor characteristic to classify a participant in some cases because the email domain may be associated with multiple roles. For instance, Microsoft® may be a partner, a customer, and a competitor.

In some implementations, a user (e.g., an administrator) can define the probabilistic algorithms used by the a posteriori classification engine 228. For example, suppose customer Y is a customer of business X and that the management of business X is interested in tracking the percentage of communication between business X and customer Y that relates to sales. Further, suppose that a number of employees from business X and a number of employees from business Y are in communication via email. Some of these employees may be in communication to discuss sales. However, it is also possible that some of the employees may be in communication for technical support issues, invoicing, or for personal reasons (e.g., a spouse of a business X employee may work at customer Y). Thus, in this example, to track the percentage of communication between business X and customer Y that relates to sales the user may define a probabilistic algorithm that classifies communications based on the probability that the communication relates to sales. The algorithm for determining the probability may be based on a number of pieces of metadata associated with each communication. For example, the metadata may include the sender's job title, the recipient's job title, the name of the sender, the name of the recipient, whether the communication identifies a product number or an order number, the time of communication, a set of keywords in the content of the communication, etc.

Using the a posteriori classification engine 228, data may be classified based on metadata associated with the data. For example, the communication in the above example can be classified based on whether it relates to sales, supplies, project development, management, personnel, or is personal. The determination of what the data relates to can be based on any criteria. For example, the determination may be based on keywords associated with the data, the data owner, the data author, the identity or roles of users who have accessed the data, the type of data file, the size of the file, the data the file was created, etc.

In certain embodiments, the a posteriori classification engine 228 can use the heuristics engine 230 to facilitate classifying data. Further, in some cases, the a posteriori classification engine 228 can use the heuristics engine 230 to validate classifications, to develop probable associations between potentially related content, and to validate the associations as the data collection system 132 collects more data. In certain embodiments, the a posteriori classification engine 228 may base the classifications of data on the associations between potentially related content. In some implementations, the heuristic engine 230 may use machine learning techniques to optimize or update the heuristic algorithms.

In some embodiments, a user (e.g., an administrator) can verify whether the data or metadata has been correctly classified. Based on the result of this verification, in some cases, the a posteriori classification engine 228 may correct or update one or more classifications of previously processed or classified data. Further, in some implementations, the user can verify whether two or more pieces of data or metadata have been correctly associated with each other. Based on the result of this verification, the a posteriori classification engine 228 using, for example, the heuristics engine 230 can correct one or more associations between previously processed data or metadata. Further, in certain embodiments, one or more of the a posteriori classification engine 228 and the heuristics engine 230 may update one or more algorithms used for processing the data provided by the data collection system 132 based on the verifications provided by the user.

In some embodiments, the heuristics engine 230 may be used as a separate classification engine from the a priori classification engine 226 and the a posteriori classification engine 228. Alternatively, the heuristics engine 230 may be used in concert with one or more of the a priori classification engine 226 and the a posteriori classification engine 228. Similar to the a posteriori classification engine 228, the heuristics engine 230 generally classifies data after the data has been collected and stored at the databases 232. However, in some cases, the heuristics engine 230 can also be used to classify data as it is collected by the collection engine 202.

The heuristics engine 230 can use any type of heuristic algorithm for classifying data. For example, the heuristics engine 230 can determine whether a number of characteristics are associated with the data and based on the determination, classify the data. For example, data that mentions a product, includes price information, addresses (e.g., billing and shipping addresses), and quantity information may be classified as sales data. In some cases, the heuristics engine 230 can classify data based on a subset of characteristics. For example, if a majority or two-thirds of characteristics associated with a particular classification are identified as existing in a set of data, the heuristics engine 230 can associate the classification with the set of data. In some cases, the heuristics engine 230 determines whether one or more characteristics are associated with the data. In other words, the heuristics engine can determine whether a particular characteristic is or is not associated with the data. Alternatively, or in addition, the heuristics engine 230 can determine the value or attribute of a particular characteristic associated with the data. The value or attribute of the characteristic may then be used to determine a classification for the data. For example, one characteristic that may be used to classify data is the length of the data. For instance, in some cases, a long email may make one classification more likely that a short email.

The a priori classification engine 226 and the a posteriori classification engine 228 can store the data classification at the databases 232. Further, the a posteriori classification engine 228 and the heuristics engine 230 can store the probable associations between potentially related data at the databases 232. In some cases, as classifications and associations are updated based on, for example, user verifications or updates to the a posteriori and heuristic classification and association algorithms, the data or metadata stored at the databases 232 can be modified to reflect the updates.

Users can communicate with the BIM system 130 using a client computing system (e.g., client 114, client 116, or client 118). In some cases, access to the BIM system 130, or to some features of the BIM system 130, may be restricted to users who are using clients associated with the computing environment 102. As described above, in some cases, at least some users can access the BIM system 130 to verify classifications and associations of data by the data classification system 134. In addition, in some cases, at least some users can access at least some of the data and/or metadata stored at the data classification system 134 using the BIM access system 136. The BIM access system 136 can include a user interface 240, a query manager 242, and a query security manager 244.

The user interface 240 can generally include any system that enables a user to communicate with the BIM system 130. Further, the user interface 240 enables the user to submit a query to the BIM system 130 to access the data or metadata stored at the databases 232. Moreover, the query can be based on any number of or type of data or metadata fields or variables. Advantageously, in certain embodiments, by enabling, a user to create a query based on any number or type of fields, complex queries can be generated. Further, because the BIM system 130 can collect and analyze data from a number of internal and external data sources, a user of the BIM system 130 can extract data that is not typically available by accessing a single data source. For example, a user can query the BIM system 130 to locate all personal messages sent by the members of the user's department within the last month. As a second example, a user can query the BIM system 130 to locate all helpdesk requests received in a specific month outside of business hours that were sent by customers from Europe. As an additional example, a product manager may create a query to examine customer reactions to a new product release or the pitfalls associated with a new marketing campaign. The query may return data that is based on a number of sources including, for example, emails received from customers or users, Facebook® posts, Twitter® feeds, forum posts, quantity of returned products, etc.

Further, in some cases, a user can create a relatively simple query to obtain a larger picture of an organization's knowledge compared to systems that are incapable of integrating the potentially large number of information sources used by some businesses or organizations. For example, a user can query the BIM system 130 for information associated with customer X over a time range. In response, the BIM system 130 may provide the user with all information associated with customer X over the time range, which can include who communicated with customer X, the percentage of communications relating to specific topics (e.g., sales, support, etc.), the products designed for customer X, the employees who performed any work relating to customer X and the employees' roles, etc. This information may not be captured by a single source. For example, the communications may be obtained from an email server, the products may be identified from product drawings, and the employees and their roles may be identified by examining who accessed specific files in combination with the employees' human resources (HR) records.

The query manager 242 can include any system that enables the user to create the query. The query manager 242 can cause the available types of search parameters for searching the databases 232 to be presented to a user via the user interface 240. These search parameter types can include any type of search parameter that can be used to form a query for searching the databases 232. For example, the search parameter types can include names (e.g., employee names, customer names, vendor names, etc.), data categories (e.g., sales, invoices, communications, designs, miscellaneous, etc.), stored data types (e.g., strings, integers, dates, times, etc.), data sources (e.g., internal data sources, external data sources, communication sources, sales department sources, product design sources, etc.), dates, etc. In some cases, the query manager 242 can also parse a query provided by a user. For example, some queries may be provided using a text-based interface or using a text-field in a Graphical User Interface (GUI). In such cases, the query manager 242 may be configured to parse the query.

The query manager 242 can further include any system that enables the user to create or select a query package that serves as the query. In certain embodiments, the query manager 242 can maintain query packages for each user, group of users, and/or the like. The query packages can be stored, for example, in a SQL database that maintains each user's query packages in a table by a unique identifier. In some embodiments, each user may have a profile that includes a list of package identifiers for that user. The query manager 242 can cause query packages associated with the user to be presented and made selectable via the user interface 240. In various embodiments, the query manager 242 can also facilitate creation of new query packages. New query packages can be made accessible to users in various ways. For example, the new query packages can be created by the user, shared with the user by another user, pushed to the user by an administrator, or created in another fashion.

Further, the query manager 242 can cause any type of additional options for querying the databases 232 to be presented to the user via the user interface 240. These additional options can include, for example, options relating to how query results are displayed or stored.

In some cases, access to the data stored in the BIM system 130 may be limited to specific users or specific roles. For example, access to the data may be limited to "Bob" or to senior managers. Further, some data may be accessible by some users, but not others. For example, sales managers may be limited to accessing information relating to sales, invoicing, and marketing, technical managers may be limited to accessing information relating to product development, design and manufacture, and executive officers may have access to both types of data, and possibly more. In certain embodiments, the query manager 242 can limit the search parameter options that are presented to a user for forming a query based on the user's identity and/or role.

The query security manager 244 can include any system for regulating who can access the data or subsets of data. The query security manager 244 can regulate access to the databases 232 and/or a subset of the information stored at the databases 232 based on any number and/or types of factors. For example, these factors can include a user's identity, a user's role, a source of the data, a time associated with the data (e.g., the time the data was created, a time the data was last accessed, an expiration time, etc.), whether the data is historical or current, etc.

Further, the query security manager 244 can regulate access to the databases 232 and/or a subset of the information stored at the databases 232 based on security restrictions or data access policies implemented by the business logic security manager 208. For example, the business logic security manager 208 may identify all data that is "sensitive" based on a set of rules, such as whether the data mentions one or more keywords relating to an unannounced product in development. Continuing this example, the business logic security manager 208 may label the sensitive data as, for example, sensitive, and may identify which users or roles, which are associated with a set of users, can access data labeled as sensitive. The query security manager 244 can then regulate access to the data labeled as sensitive based on the user or the role associated with the user who is accessing the databases 232.

Although illustrated separately, in some embodiments, the query security manager 244 can be included as part of the query manager 242. Further, in some cases, one or both of the query security manager 244 and the query manager 242 can be included as part of the user interface 240. In certain embodiments, some or all of the previously described systems can be combined or further divided into additional systems. Further, some or all of the previously described systems may be implemented in hardware, software, or a combination of hardware and software.

Implementation of Queries to Multiple Data Sources

Figure 3:
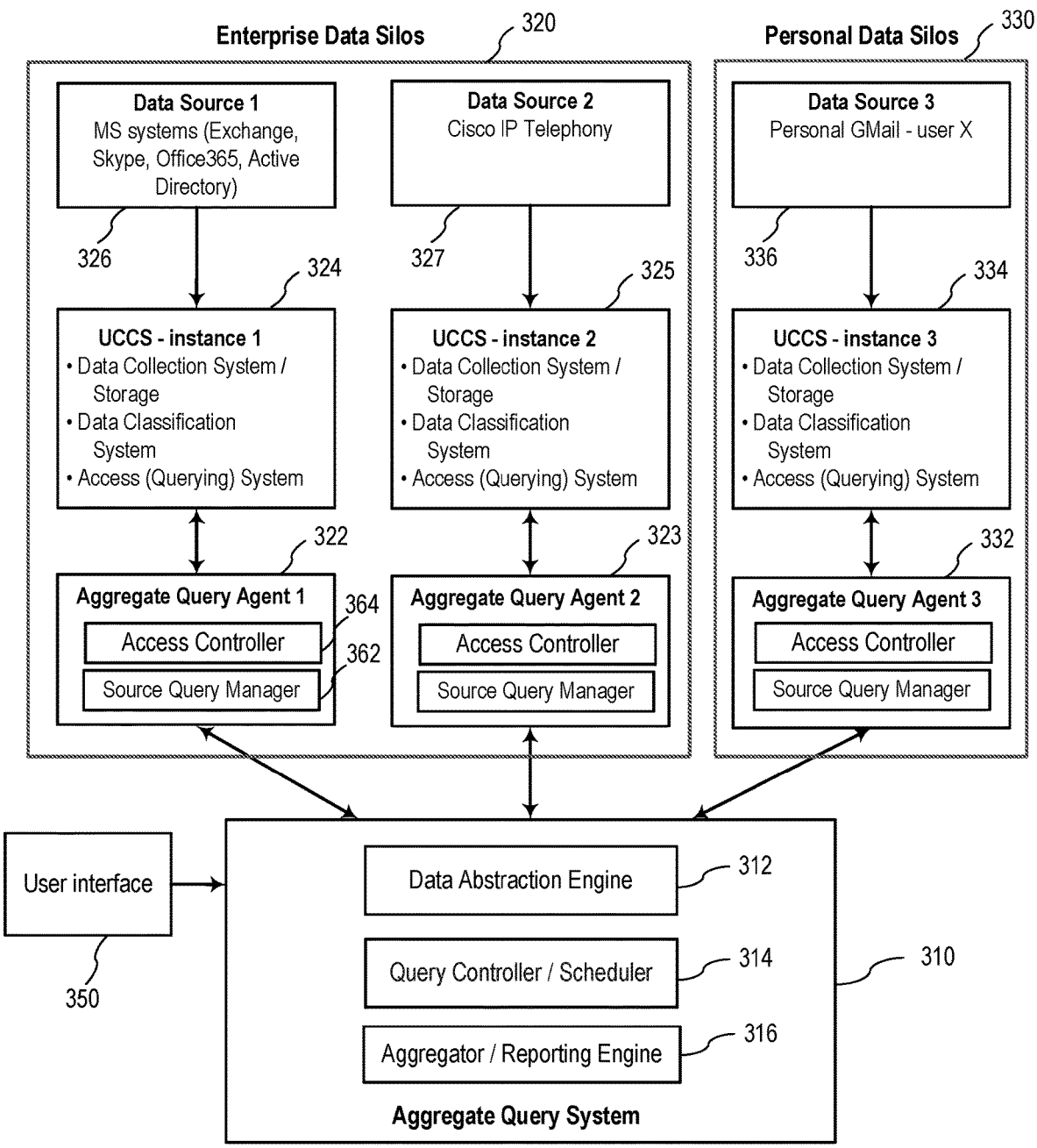
FIG. 3 depicts a query aggregation system for multi-data source query implementation and aggregation according to embodiments of the present disclosure.

In certain situations, a user or group wants to send queries to multiple data sources including both disparate enterprise systems and private source, such as personal email accounts, and generate single insights across those disparate data sources. FIG. 3 depicts a query aggregation system for multi data source query implementation and aggregation according to embodiments of the present disclosure. The query aggregation system 310 comprises a data abstraction engine 312, a query controller or scheduler 314 and an aggregator (or reporting engine) 316. The data abstraction engine 312 normalizes data schemas from multiple (but similar) data sources based on the parameter requirements of each query from a user (user X) via a user interface 350. Although the exemplary system shown in FIG. 3 receives query parameter(s) from the user interface 350, it is understood that other configurations may be implemented. For example, the user interface 350 may be incorporated as an internal component of the query aggregation system 310. The query controller 314 schedules and runs normalized queries against each data sources independently and securely. The aggregator 316 collects and merges the aggregates of the results into a single analysis. The query aggregation system 310 communicates to various data sources (including enterprise data silo 320 and personal data silo 330) to send queries and receive query results. In some embodiments, the query sent to each data source is specialized or tailored for the specific requirement of the data source.

As shown in FIG. 3, the first data source 326 is a Microsoft data source administered within the enterprise by an IT admin responsible for Exchange Skype, Office 365, Active directory etc. The first data source is accessible to a first Unified Communications Command Suite (UCCS) 324, operated through a first aggregate query agent 322. The UCCS may also be referred to as the Business Insight on Messaging (BIM) system as disclosed above. Each UCCS comprises a data collection system, a data classification system, and an access (querying) system. The function of each component within the UCCS is described above in related to FIGS. 1-2. The second data source 327 is a CISCO telephony data source, accessible to a second Unified Communications Command Suite (UCCS) 325, operated through a second aggregate query agent 323.

Besides the data sources within the enterprise data silo 320, the query aggregation system 310 may also communicate to a personal data silo 330 comprising a third data source 336, which may be a personal email data source (such as Gmail) 336 for user X, accessible to a third Unified Communications Command Suite (UCCS) 334, operated through a third aggregate query agent 332.

Each aggregate query agent 322, 323 or 332 comprises a source query manager 362 and an access controller 364. The functions of both components will be disclosed in following paragraphs.

Figure 4:
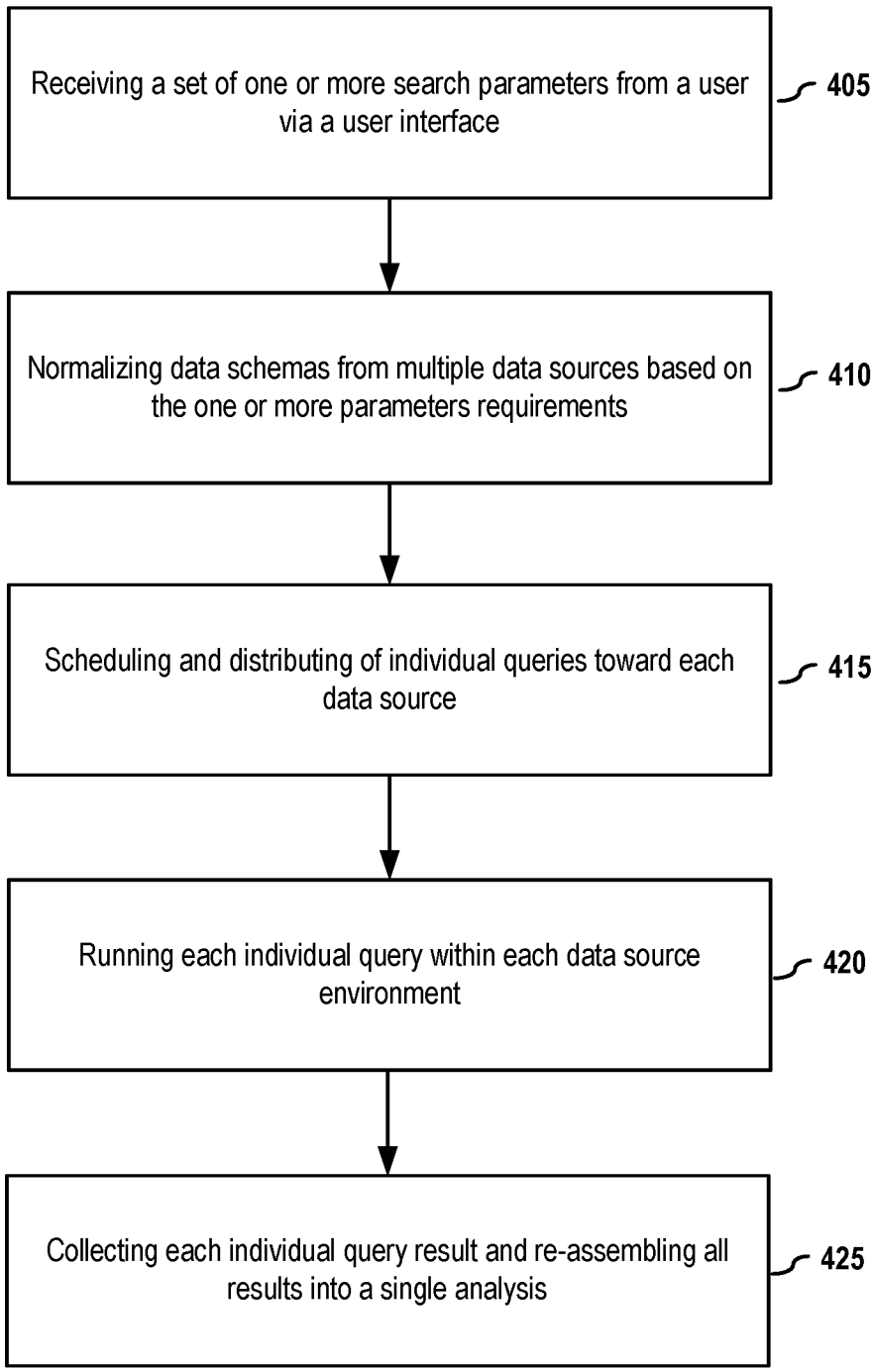
FIG. 4 depicts a flowchart of an example of a query aggregation process according to embodiments of the present disclosure.

FIG. 4 depicts a flowchart of an example of a query aggregation process 400 according to embodiments of the present disclosure. In step 405, a set of one or more search parameters from a user (user X) via a user interface 350 (shown in FIG. 3) is received. In some embodiments, the search parameters may be provided by a client or a user equipment. For instance, an application or script may be configured to query the query aggregation system 310 every month to determine the workload of each employee or of the employees in a specific department of an organization to determine, for example, whether additional employees are needed or whether the allocation of human resources within different departments should be redistributed. In this example, the application can determine whether to alert a user based on the result of the determination. In some implementations, a user can provide a text-based query to the user interface. This text-based query can be parsed by, for example, the user interface. Alternatively, or in addition, the user interface can provide a set of query options and/or fields that a user can use to formulate a query of the query aggregation system 310. The query options or fields can include any type of option or field that can be used to form a query of the query aggregation system 310. For example, the query options or fields can include tags, classifications, time ranges, keywords, user identifiers, user roles, customer identifiers, vendor identifiers, corporate locations, geographic locations, etc.

At step 410, the data abstraction engine 312 formats at least one query based on the query parameters received at step 405. The number of query may be dependent on numbers of data sources coupled to the query aggregation system 310. Formatting the at least one query may include transforming the search parameters and query options provided by the user into a form that can be processed by the query aggregation system 310 with or without modification. In some embodiments, the data abstraction engine 312 normalizes the private data to what the corporate schema expects. For example, the query aggregation system 310 provides a UCCS user specific templates (such as GMAIL) or generic templates (such as web mail) for data format matching. This process can be automated for standard apps like email. For other data sources, some manual matching could be required. For example if one wanted to compare their personal Facebook response times to corporate email. A template would suggest that direct messages could equate emails. In some cases, the types of personal data would not automatically be equated to corporate data—mostly because metadata and usage logs wouldn't be available, but manual association could be created.

At step 415, the query controller 314 manages the scheduling and running of individual queries in their own protected data environments. For example a query may be run against Exchange data behind a corporate firewall, while a sister query would be run against the user's personal email account. Depending on privacy and security policies, the data returned may be anonymized or aggregated.

At step 420, each individual query toward respective data source is ran to obtain individual query result. Within each data silo, the query is operated by an aggregate query agent (322, 323 or 332) comprising an access controller and a source query manager. Each aggregate query agent may further apply a limitation to the query. For example, the source query manager 362 can include any system for regulating who can access the data or subsets of data. The source query manager 362 can also regulate access to the databases and/or a subset of the database stored at the databases based on any number and/or types of factors. These factors may include a user's identity, a user's role, a source of the data, a time associated with the data (e.g., the time the data was created, a time the data was last accessed, an expiration time, etc.), whether the data is historical or current, security restrictions or data access policies etc. The source query manager 362 can then regulate access to the data labeled as sensitive based on the user or the role associated with the user who is accessing the databases. In some embodiments, the access controller 364 facilitates access to the corresponding data source. In some embodiments, the access controller 364 may have credentials or authentication information associated with a master or super user account enabling access to some or all of the user accounts without requiring credentials or authentication information associated with each of the users. In some embodiments, each aggregate query agent operates in parallel (and independently) to provide query results to the aggregator 316.

At step 425, the aggregator 316 collects the various query results and re-assembles them into a single analysis. This wouldn't be simply a data merge as some of the query results may be in a different state. The analysis would show the query results as if they were from one set of data, while maintaining different access to raw data if available. For example, if a plurality of competitors opted to share aggregate data in order to produce industry benchmarks, each company could still drill down to their own raw data, which are not accessible to others. This would enable them to view industry statistics while being able to access specific example from their own data. A scenario could be looking for outliers to the norm, or examples of non-compliance.

Figure 5:
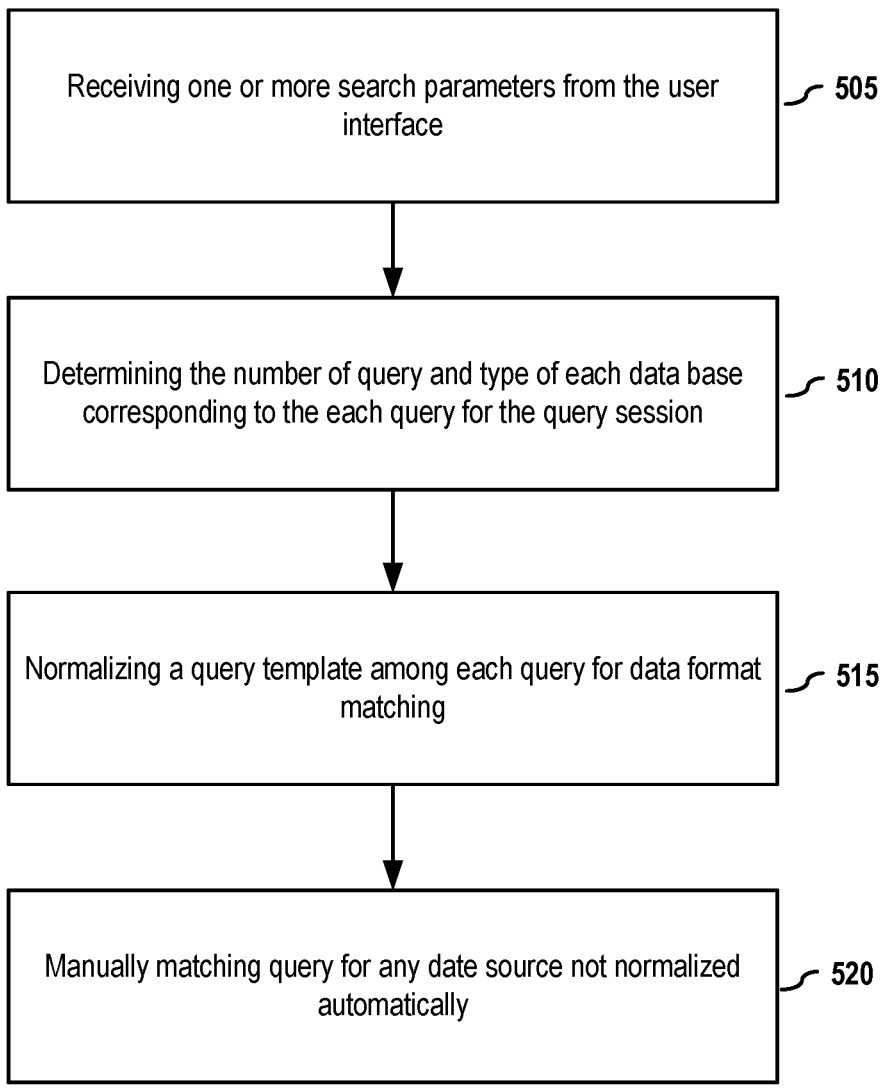
FIG. 5 depicts an exemplary flowchart of an abstraction engine to normalize data schemas from multiple data sources according to embodiments of the present disclosure.

FIG. 5 depicts an exemplary flowchart of an abstraction engine to normalize data schemas from multiple data sources according to embodiments of the present disclosure. At step 505, the data abstraction engine 312 receives one or more query parameters a user X input via the user interface 350. At step 510, the data abstraction engine 312 determines numbers of query and type of each data base corresponding to the each query for the query session. At step 515, the data abstraction engine 312 normalizes a query template among each query for data format matching. In some embodiments, the data abstraction engine 312 normalizes the private data to what the corporate schema expects. For example, the data abstraction engine 312 provides a UCCS user specific templates (such as GMAIL) or generic templates (such as web mail) for data format matching. In some embodiments, this step can be done automatically. At step 520, manually matching query is implemented optionally for any data source not normalized automatically. For example if one wanted to compare their personal Facebook response times to corporate email. A template would suggest that direct messages could equate emails. In some cases, the types of personal data would not automatically be equated to corporate data—mostly because metadata and usage logs wouldn't be available, but manual association could be created.

Figure 6:
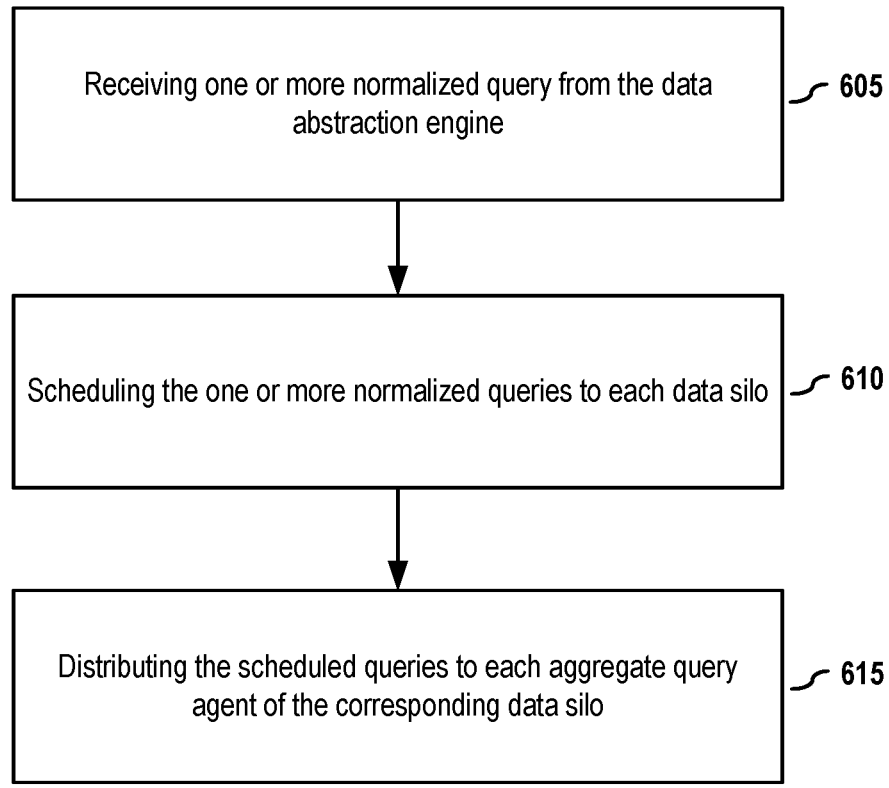
FIG. 6 depicts an exemplary flowchart of a query controller to schedule and run normalized queries against each data sources according to embodiments of the present disclosure.

FIG. 6 depicts an exemplary flowchart of a query controller to schedule and run normalized queries against each data sources according to embodiments of the present disclosure. At step 605, the query controller 314 receives one or more normalized queries from the data abstraction engine 312. At step 610, the query controller 314 schedules the one or more normalized queries to each data silo couples to the aggregate query system 310. In some embodiments, the queries are scheduled to be sent in parallel. In some embodiments, the queries are scheduled to be sent in serial. In some embodiments, the queries are scheduled to be sent according to a predetermined or dynamically determined arrangement. For example, the query to a silo having a larger data source is scheduled to be sent earlier. Similarly, the query to a silo having heavier data traffic is scheduled to be sent earlier. At step 615, the query controller 314 distributes the scheduled queries to each aggregate query agent of the corresponding data source.

Figure 7:
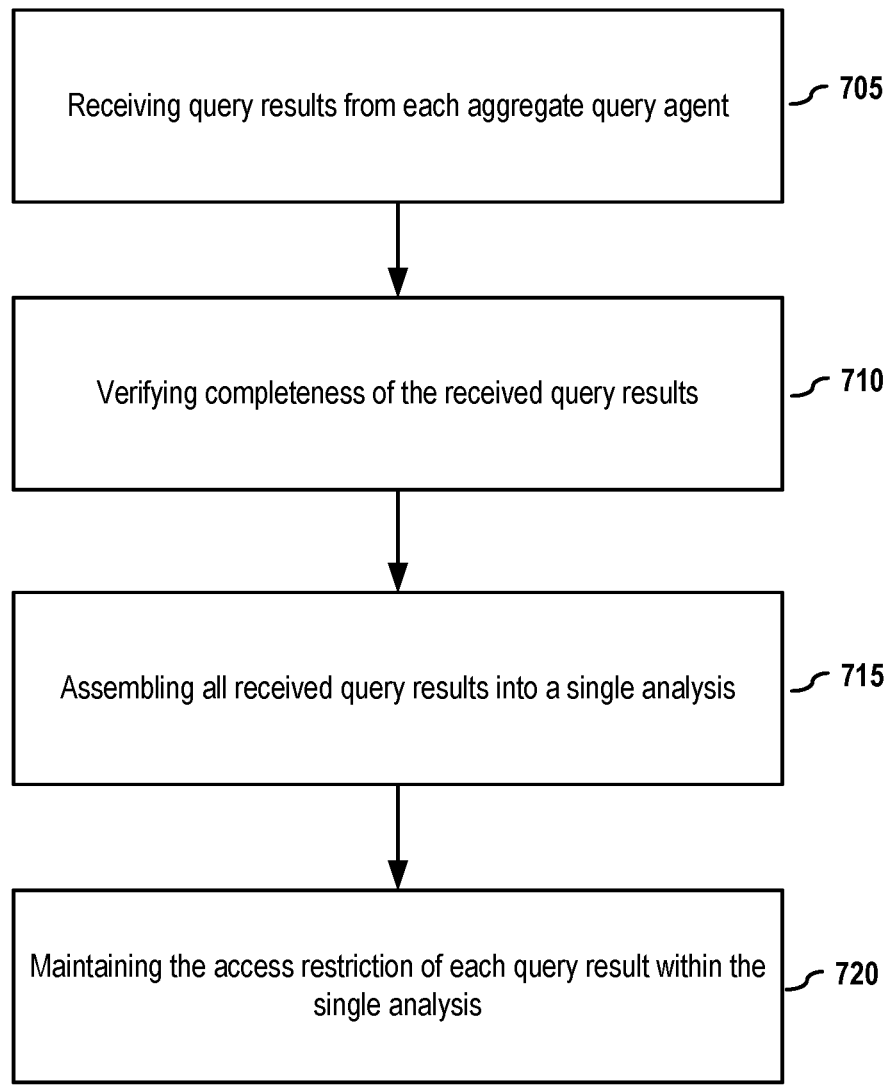
FIG. 7 depicts an exemplary flowchart of an assembler merging all query results to generate interactive analytics dashboard according to embodiments of the present disclosure.

FIG. 7 depicts an exemplary flowchart of an assembler merging all query results to generate interactive analytics dashboard according to embodiments of the present disclosure. At step 705, the aggregator 316 receives query results from each aggregate query agent according to a receiving schedule. The receiving schedule may be pre-determined or determined dynamically based on at least on parameters such as the size of each query result, the data traffic of each silo, time interval pre-assigned to each query result, etc. In some embodiments, the receiving schedule includes a schedule for retransmission of query result when the aggregate query agent does not receive a successful receiving confirmation from the aggregator 316 within a predetermined time period after initial query result transmission. At step 710, the aggregator 316 verifies completeness of the received query results by comparing the number of received query results to the queries sent from query controller 314. At step 715, the aggregator 316 re-assembles all received query results into a single analysis. In some embodiments, the reassembling step starts after the received query results being verified as complete or after a predetermined time interval such that the aggregator 316 may proceed reassembling even one of the aggregate query agents failed to send an individual query result within the predetermined time interval for various problems. If the aggregator 316 detects any missing individual query result, the aggregator 316 adds a note or alert within the single analysis for the issue. At step 720, the aggregator 316 maintains the access restriction of each query result within the single analysis such that each user may only access the raw data associated to the user.

Although exemplary steps are shown in FIGS. 4-7 for implementation of query aggregation process and sub-process, one skilled in the art shall recognize that: (1) certain steps may optionally be performed; (2) steps may not be limited to the specific order set forth herein; (3) certain steps may be performed in different orders; and (4) certain steps may be done concurrently.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 8:
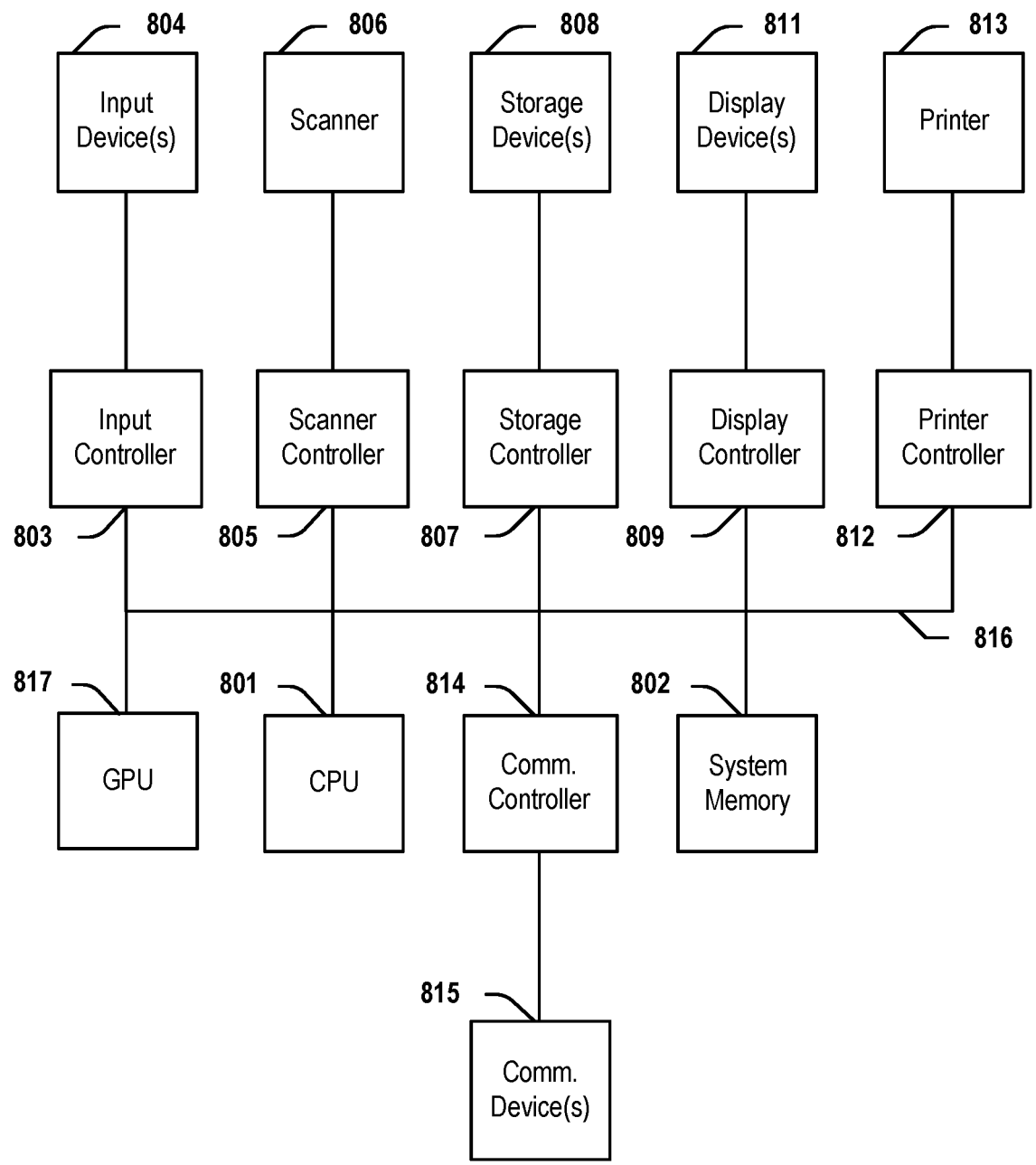
FIG. 8 depicts a simplified block diagram of an information handling system according to embodiments of the present invention.

FIG. 8 depicts a block diagram of an information handling system 800 according to embodiments of the present invention. It will be understood that the functionalities shown for system 800 may operate to support various embodiments of an information handling system—although it shall be understood that an information handling system may be differently configured and include different components. As illustrated in FIG. 8, system 800 includes a central processing unit (CPU) 801 that provides computing resources and controls the computer. CPU 801 may be implemented with a microprocessor or the like, and may also include a graphics processor and/or a floating point coprocessor for mathematical computations. System 800 may also include a system memory 802, which may be in the form of random-access memory (RAM) and read-only memory (ROM).

A number of controllers and peripheral devices may also be provided, as shown in FIG. 8. An input controller 803 represents an interface to various input device(s) 804, such as a keyboard, mouse, or stylus. There may also be a scanner controller 805, which communicates with a scanner 806. System 800 may also include a storage controller 807 for interfacing with one or more storage devices 808 each of which includes a storage medium such as magnetic tape or disk, or an optical medium that might be used to record programs of instructions for operating systems, utilities and applications which may include embodiments of programs that implement various aspects of the present invention. Storage device(s) 808 may also be used to store processed data or data to be processed in accordance with the invention. System 800 may also include a display controller 809 for providing an interface to a display device 811, which may be a cathode ray tube (CRT), a thin film transistor (TFT) display, or other type of display. The computing system 800 may also include a printer controller 812 for communicating with a printer 813. A communications controller 814 may interface with one or more communication devices 815, which enables system 800 to connect to remote devices through any of a variety of networks including the Internet, an Ethernet cloud, an Fiber Channel over Ethernet (FCoE)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated that the preceding examples and embodiments are exemplary and are for the purposes of clarity and understanding and not limiting to the scope of the present invention. It is intended that all alternatives, permutations, enhancements, equivalents, combinations, and improvements thereto that are apparent to those skilled in the art, upon a reading of the specification and a study of the drawings, are included within the scope of the present invention. It is therefore intended that the claims include all such alternatives, permutations, enhancements, equivalents, combinations, and improvements fall within the true spirit and scope of the present invention, unless the following claims by their language expressly state otherwise.

What is claimed is:

1. A computer-implemented method for multi-data source query implementation and aggregation comprising:
    receiving a set of one or more search parameters from a user interface;
    normalizing data schemas from multiple data sources based on the one or more search parameters;
    distributing individual queries toward each data source;
    running each individual query in respective data source to obtain individual query result;
    collecting each individual query result and reassembling collected query results into a single analysis while maintaining any access restriction of each query result within the single analysis such that a user may only access data associated with the user;
    creating a query package that includes each individual query; and
    storing the query package in a data storage with an associated unique identifier, wherein the query package includes one or more visualizations of queried data.

2. The computer-implemented method of claim 1 wherein the multiple data sources comprising at least one enterprise data sources and at least one personal data sources.

3. The computer-implemented method of claim 1 wherein the step of normalizing data schemas from multiple data sources comprising normalizing a query template for data format matching.

4. The computer-implemented method of claim 3 wherein the step of normalizing data schemas from multiple data sources comprising automatically and manually matching the query template.

5. The computer-implemented method of claim 1 wherein collecting each individual query result and reassembling collected query results into a single analysis comprises verifying completeness of collected query results.

6. The computer-implemented method of claim 5 wherein the set of reassembling collected query results into a single analysis is implemented after the completeness of collected query results is verified or after a predetermined time interval.

7. The computer-implemented method of claim 6, wherein the access restriction is maintained within the single analysis.

8. The computer-implemented method of claim 1 wherein running each individual query in respective data source is operated via each corresponding aggregate query agent.

9. The computer-implemented method of claim 8 wherein the aggregate query agent comprising a source query manager to apply access limitations of the query and an access controller to facilitate access to corresponding data source.

10. A system for multi-data source query implementation and aggregation comprising:
    a memory; and
    one or more processors configured to execute a set of instructions comprising:
    normalize a query template for multiple data sources based on the one or more query parameters input via a user interface;
    distribute individual queries toward the multiple data sources, each data source comprising an aggregate query agent to receive one individual query, implement the individual query and obtain one individual query result;
    collect the individual query result from each data source and reassembling collected query results into a single analysis while maintaining any access restriction of each query result within the single analysis such that a user may only access data associated with the user;
    create query package that includes each individual query; and
    cause the query package to be stored in a data storage with an associated unique identifier, wherein the query package includes one or more visualizations of queried data.

11. The system of claim 10 wherein the multiple data sources comprising at least one enterprise data source and at least one personal data source.

12. The system of claim 11 wherein the enterprise data sources comprising a plurality of different types of data sources.

13. The system of claim 10 wherein the query template is normalized automatically or manually for data format matching.

14. The system of claim 10 wherein the individual queries toward each data source are scheduled and distributed according to an arrangement based at least on size or data traffic of each data source.

15. The system of claim 10 wherein the individual query results are collected according to a schedule determined based on at least a parameter selected from the size the query result, the data traffic of each date source, a time interval pre-assigned to each aggregate query agent for the individual query.

16. A computer-implemented method comprising:
    receiving an individual query to a database within a data silo with one or more search parameters;
    regulating access to the database or a subset of the database within the within a data silo based on the one or more search parameters;
    facilitating access to corresponding the databases or a subset of the database to generate a query result;
    providing the query result to an aggregator for query aggregation as a part of a single analysis while maintaining any access restriction of each query result within the single analysis such that a user may only access data associated with the user;
    creating a query package that includes the query result; and
    causing the query package to be stored in a data storage with an associated unique identifier, wherein the query package includes one or more visualizations of queried data.

17. The computer-implemented method of claim 16 wherein the individual query is specialized for accessing requirement of the database.

18. The computer-implemented method of claim 16 wherein the access restriction is maintained within the single analysis.

19. The computer-implemented method of claim 16 wherein the query result is provided to an aggregator according to a receiving schedule of the aggregator.

20. The computer-implemented method of claim 19 wherein the receiving schedule is determined based on at least one parameter selected from the size the query result, the data traffic of the data silo, a time interval pre-assigned for the individual query.

* * * * *